United States Patent [19]
Davis, Sr.

[11] 4,290,727
[45] Sep. 22, 1981

[54] HARVESTING DEVICE

[76] Inventor: William E. Davis, Sr., Kinston, N.C. 28501

[21] Appl. No.: 16,189

[22] Filed: Feb. 28, 1979

Related U.S. Application Data

[63] Continuation-in-part of Ser. No. 947,578, Oct. 2, 1978, abandoned.

[51] Int. Cl.³ ............................................. B60P 1/00
[52] U.S. Cl. ................................................... 414/508
[58] Field of Search ................... 414/26, 508; 56/27.5; 280/482, 291; 296/75; 198/848, 313

[56] References Cited

U.S. PATENT DOCUMENTS

| | | | |
|---|---|---|---|
| 1,125,281 | 1/1915 | Fentress | 280/291 |
| 2,431,000 | 11/1947 | Step | 414/505 |
| 3,207,328 | 9/1965 | Lewis | 414/26 |
| 3,229,831 | 1/1966 | Long | 414/26 |
| 3,494,456 | 2/1970 | Peterson | 198/848 |
| 3,767,034 | 10/1973 | Teagle | 198/848 |
| 3,767,231 | 10/1973 | Grosse-Rhode | 280/482 |
| 3,784,247 | 1/1974 | Mills | 296/75 |
| 3,788,461 | 1/1974 | Friesen | 198/848 |
| 4,026,431 | 5/1977 | Long | 414/508 |
| 4,058,198 | 11/1977 | O'Neil et al. | 198/313 |

Primary Examiner—Stephen G. Kunin
Assistant Examiner—L. E. Williams
Attorney, Agent, or Firm—Mills & Coats

[57] ABSTRACT

In abstract a preferred embodiment of this invention is a tobacco harvester having staggered cropper seats with only one seat on each side being outboard of the confines of the device. An inclined central conveyor, in combination with a lateral conveyor for each of the outboard cropper seats, conveys and lifts the tobacco from its priming location for deposit in a bulk curing box carried on a separate detachable trailer. An extension tongue for the trailer and/or an extension conveyor can be provided to allow two or more bulk boxes to be filled on the same trailer prior to replacement of the same.

13 Claims, 9 Drawing Figures

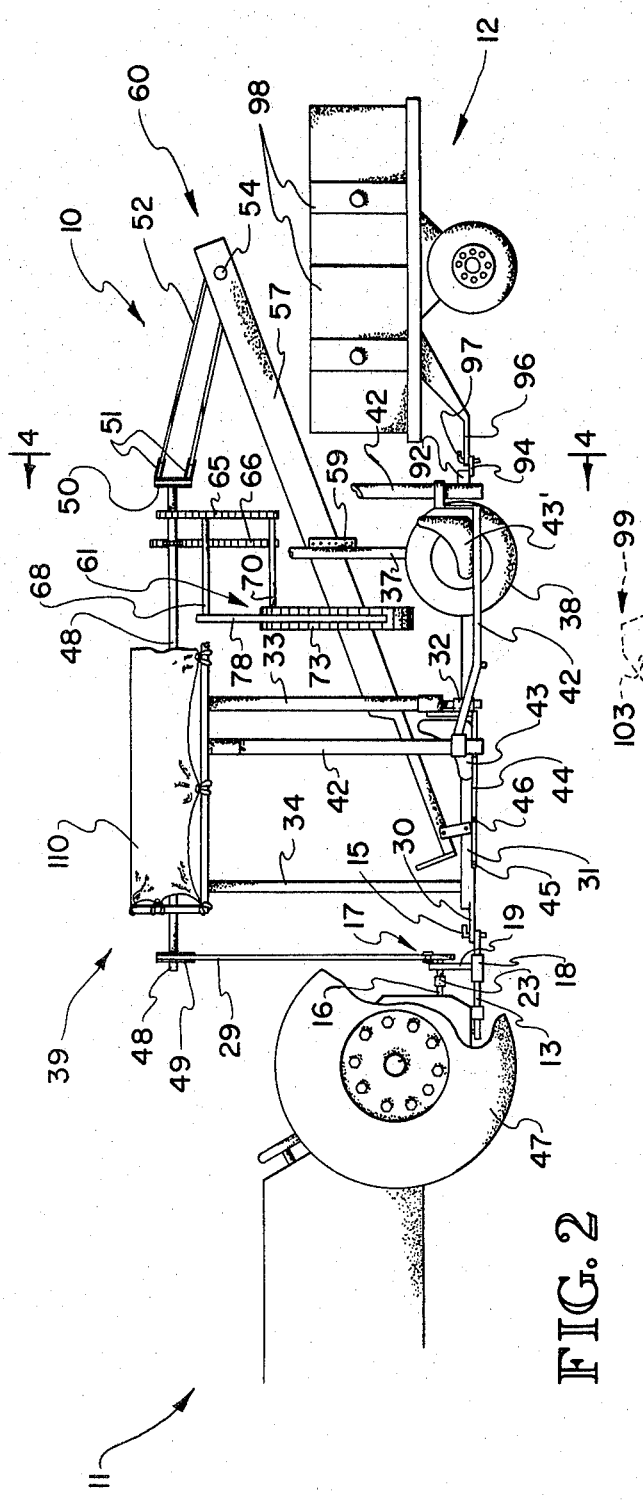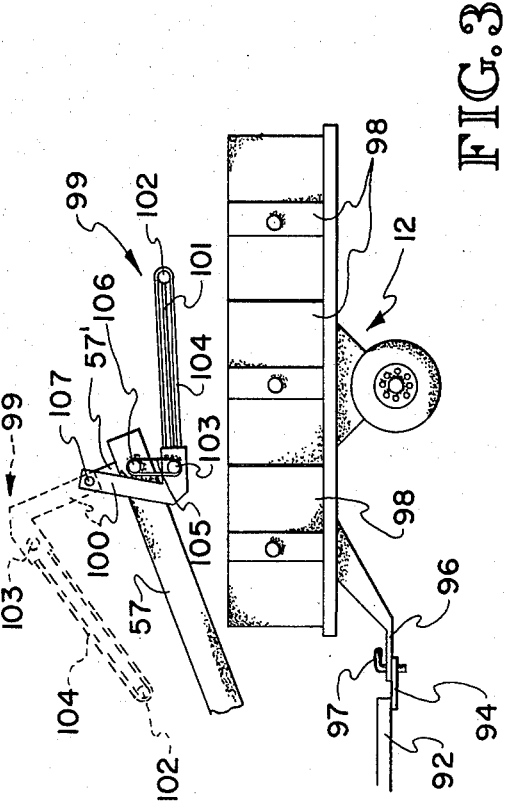

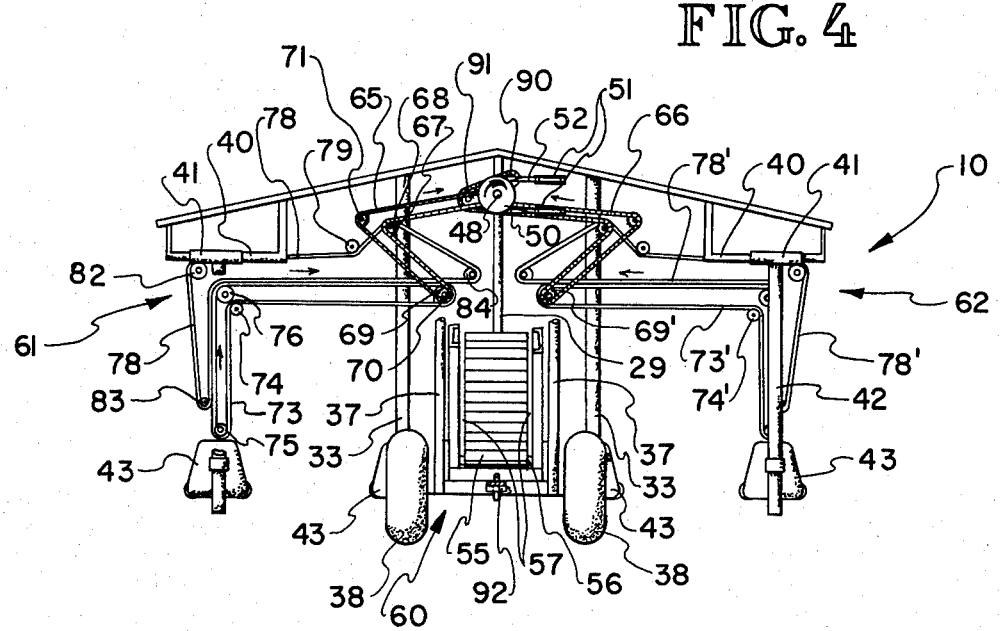
FIG. 4
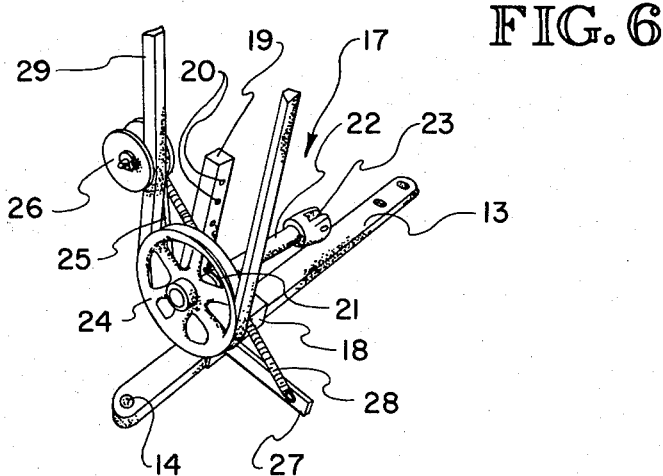
FIG. 5  FIG. 6
FIG. 7

HARVESTING DEVICE

CROSS REFERENCE TO RELATED APPLICATION

This is a continuation-in-part of U.S. patent application Ser. No. 947,578, filed Oct. 2, 1978, entitled "HARVESTING DEVICE", now abandoned.

FIELD OF INVENTION

This invention relates to agricultural devices and more particularly to tobacco type harvesters.

BACKGROUND OF THE INVENTION

When tobacco was first commercially raised, labor was relatively inexpensive and the harvesting or priming of the leaves was accomplished by hand, placing the same usually in a sled type conveyor for transport back to the curing barn.

As labor became harder to get and more expensive, various types of riding harvesters with various types of conveyor means from the primer or cropper station to a central location were developed. These devices have been directly mounted on tractors, have been towed behind tractors, and have been self-propelled. They have included stations for tying the tobacco on sticks, stations for placing the tobacco in bulk curing racks and more recently provided a means for placing the tobacco in bulk curing boxes. Also in recent years, automatic tobacco primers or harvesters have been developed but these are extremely expensive and can only be economically justified where large farming operations are involved.

Each of the prior art tobacco harvesters have had their advantages and disadvantages. Some have problems with the conveyor mechanisms crushing the tobacco while others require extra personnel in the handling of the tobacco at a central deposit location. Still others have been mechanically so complex that the average farmer is unable to repair and maintain the same in proper operating condition.

SUMMARY OF INVENTION

After much research and study into the above-mentioned problems, the present invention has been developed to provide a relatively simple, improved tobacco harvester for the farmer who cannot economically justify an automatic primer and yet has need to cut labor cost to an absolute minimum. The present invention includes a centrally disposed, inclined longitudinal conveyor directly onto which two front inboard croppers deposit primed tobacco with a single set of outboard croppers having lateral conveyors for depositing their primed tobacco on said central conveyor. All lifting and handling of the tobacco is done through this system of conveyors and no lifting or other handling of the same is necessary until the loaded trailer is disconnected from the harvester and transported to the curing barn or enclosure.

In view of the above, it is an object of the present invention to provide an improved tobacco type harvesting device with stations for a pair of inboard croppers and a pair of outboard croppers.

Another object of the present invention is to provide a riding type harvester with two lateral product conveyors and a single longitudinal product conveyor.

Another object of the present invention is to provide a tobacco harvester wherein all lifting and handling of the primed crop is automatically accomplished through a simple system of inner related conveyors.

Another object of the present invention is to provide a riding type tobacco harvester pulled by a tractor wherein greater than 90 degree articulated turns can be accomplished.

Another object of the present invention is to provide a tobacco type harvester wherein a plurality of bulk type curing boxes can be mounted on a towed trailer and directly filled from the harvester.

Another object of the present invention is to provide a simplified and yet highly efficient means for harvesting leaf type crops with a minimum number of laborers being required.

Another object of the present invention is to provide a lateral conveyor means for tobacco type harvesters which will not crush the tobacco as it is being moved by such conveyors.

Another object of the present invention is to provide an improved idler system whereby an improved conveying means for leaf type crop harvesters is provided.

Another object of the present invention is to provide a conveyor height adjusting means for a harvester type device.

Another object of the present invention is to provide a conveyor extension means to allow additional crop receiving containers to be filled before having to replace the same.

Another object of the present invention is to provide an improved crop receiving trailer wherein the height of the tongue connection can be adjusted.

Another object of the present invention is to provide a crop receiving trailer with a longitudinal adjustable connector means to the harvester whereby a plurality of crop receiving containers can be filled.

Other objects and advantages of the present invention will become apparent and obvious from a study of the following description and the accompanying drawings which are merely illustrative of such invention.

BRIEF DESCRIPTION OF DRAWINGS

FIG. 2 is a side elevational view of the present invention with portions thereof cut away for clarity of illustration;

FIG. 3 is a side elevational view of the conveyor extension portion of the present invention;

FIG. 4 is a sectional view taken through lines 4—4 of FIG. 1;

FIG. 5 is a side elevational view in schematic form of the lateral crop conveying means of the present invention;

FIG. 6 is a schematic view similar to FIG. 5 showing the operation of the idler pulley;

FIG. 7 is a perspective view of the harvester tongue and power take-off connection;

DETAILED DESCRIPTION OF INVENTION

Figure 1:
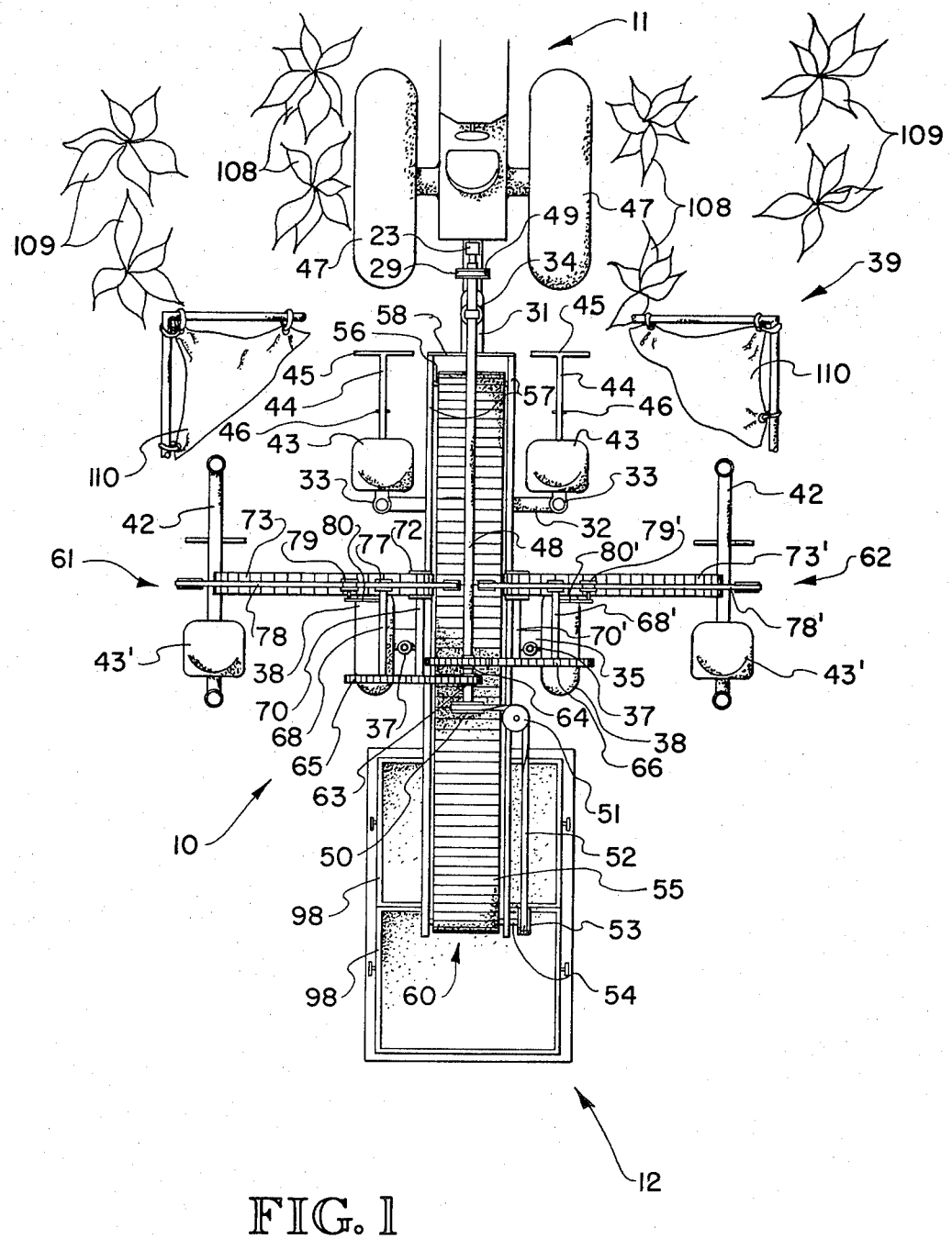
FIG. 1 is a top plan view of the tobacco harvester of the present invention with structural portions cut away for clarity of illustration.

With further reference to the drawings, the improved harvester of the present invention, indicated generally at 10, is towed by a vehicle such as the tractor indicated generally at 11 and has connected to the rear portion thereof a trailer indicated generally at 12.

The tractor 11 includes a standard draw bar 13 which terminates in an opening 14 through which draw pin 15 is adapted to pass. A standard power take-off (pto) 16 is included on tractor 11.

A harvester drive assembly, indicated generally at 17, includes a sleeve 18 which is adapted to slide over draw bar 13. An upright member 19 is fixedly secured to sleeve 18 and includes a plurality of openings 20 which allow shaft support means 21 to be adjusted up or down depending on the height of the pto relative to the draw bar of the particular tractor being used.

The shaft mounting means 21 rotatively mounts shaft 22 which has a universal joint 23 fixedly secured to one end and a pulley 24 fixedly secured to the other end. The universal joint 23 is, of course, adapted to be operatively connected to the pto 16 of the tractor 11.

An idler pulley support arm 25 is pivotably mounted at one end to upright 19 while rotatively carrying idler pulley 26 at its other end. An outwardly projecting tension arm 27 is fixedly secured to sleeve 18 with biasing spring 28 connected from the end of such arm to pivotable pulley support arm 25 thus providing proper drive tension for primary drive belt 29.

A hitch tongue 30 is adapted to secure, by means of pin 15, the harvester 10 to tractor 11. A box beam 31 secured to tongue 30 forms the main frame of harvester 10.

Secured by weldment or other suitable means to the lower portion of frame 31 is cross member 32. To each end of cross member 32 is fixedly secured an intermediate upright support member 33.

Immediately behind tongue 30 and fixedly secured to main frame 31 is forward upright support member 34.

Figure 8:
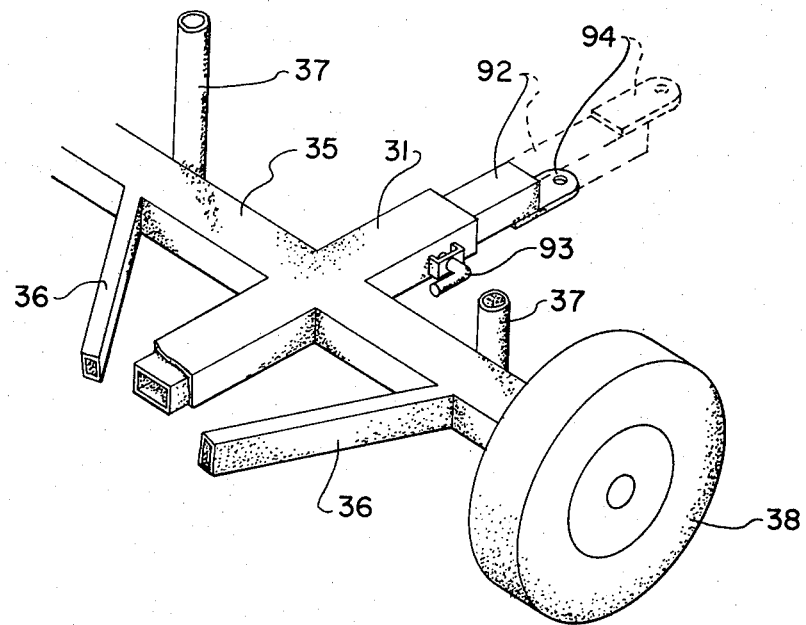
FIG. 8 is a fragmentary perspective view of the telescoping, extensible, height adjustable trailer connector of the present invention.

Fixedly secured to the rear portion of main frame 31 is a wheel support cross member 35 as seen particularly clear in FIG. 8. Wheels 38 are rotatively mounted on the ends of cross member 35 and the connection of such member to frame 31 is strengthened by means such as braces 36. Fixedly secured to cross member 35 on either side thereof are a plurality of upright rear support members 37.

The forward, intermediate and rear upright support members 34, 33, and 37, respectively, all support the roof frame indicated generally at 30. Harvester roof or cover frames of this type are well known to those skilled in the art and further detailed description of the same is not deemed necessary.

A plurality of generally U-shaped frame members 40 depend from roof frame 39. Sliding T members 41 are mounted on each of the U-shaped members 40 and have depending therefrom a somewhat U-shaped seat support frame 42. Seats 43 are provided on frame 42 in the usual manner and further detailed description of the same is not deemed necessary.

Secured to each of the forward support members 34 is a forward inboard seat 43. Outwardly and forwardly projecting from each of the seats 43 is a foot rest support 44 with a foot rest cross member 45 at the end thereof. Each foot rest support 44 is pivoted in the center thereof at 46 in such a manner that when tractor 11 turns sharply relative to harvester 10, either the foot rest can be folded back adjacent its respective seat 43 or when such foot rest comes into contact with the wheel 47 of the tractor, the same will automatically be flipped back thereof to the folded position.

In the following description of the conveyor systems of the present invention, the pulleys illustrated on the drawings will be described relative to their operation. It is understood that each of these pulleys is appropriately mounted on the frame or other portions of the present invention which have hereinabove been described. For purposes of clarity, the details of the mounting of each of these pulleys will not be delved into since their mounting on the portions described is well within the ability of those skilled in the art. For these reasons the conveyor systems are shown schematically and will, of course, be described in detail relative to operation.

A main harvester drive shaft 48 is provided which is rotatively mounted in the area of cover frame 39. A forward pulley 49 is fixedly secured to shaft 48 and has trained thereover drive belt 29 which is driven by pulley 24.

The opposite end of main harvester drive shaft 48 from pulley 49 has mounted thereon longitudinal conveyor drive pulley 50. A pair of idler pulleys 51 are provided adjacent conveyor drive pulley 50 and conveyor drive belt 52 is trained thereabout, over pulley 50 and around conveyor drive shaft pulley 53. This latter mentioned pulley is, of course, fixedly secured to conveyor drive shaft 54 over which belt like conveyor 55 is trained. The opposite end of conveyor 55 from drive shaft 54 is supported by idler shaft 56. Shafts 54 and 56 are both rotatively supported by elongated conveyor side members 57. The lower end of inclined or longitudinal conveyor 55 is mounted on main frame 31 by cross member 58 which is pivotably secured to such frame. The rear or upper portion of conveyor side members 57 are adjustably supported on adjacent rear support members 37 by means such as brackets 59.

Although not specifically shown, it is, of course, understood that conveyor 55 can be carried either directly on shafts 54 and 56 or can be appropriately mounted on sprockets, pulleys or the like, all of which are considered conventional and well within the ability of those skilled in the art.

Having now described in detail the operation of the inclined, longitudinal conveyor indicated generally at 60, the two lateral conveyors indicated generally at 61 and 62, which are also driven by main harvester drive shaft 48, will be described, FIGS. 1 and 4 being particularly referred to for this purpose.

Chain drive sprockets 63 and 64 are fixedly secured to drive shaft 48 as can be seen in FIG. 1. Drive chains 65 and 66 are provided for driving engagement with sprockets 63 and 64, respectively.

First, considering the left side lateral conveyors 61, drive chain 65 is trained over sprocket 63 and then around sprocket 67 (when the chain is considered as moving in the direction of its adjacent arrow in FIG. 4 and shaft 48 is rotating in the direction of the curved arrow adjacent thereto). Sprocket 67 is fixedly secured to one end of shaft 68. Chain 65 is next trained about sprocket 69 which is fixedly mounted on one end of shaft 70. Said chain 65 is then trained about idler sprocket 71 and back over sprocket 63.

As chain 65 is driven in the direction and manner hereinabove described, shafts 68 and 70 will be rotatively driven. Mounted on the end of shaft 70 opposite sprocket 69 is conveyor drive pulley 72. This pulley is adapted to drive conveyor belt 73 upwardly and inwardly as indicated by the arrow adjacent thereto. Conveyor 73 is trained over idler pulleys 74, 75, and 76 as indicated.

Shaft 68, which is driven by the same chain drive as shaft 70, has fixedly secured to its end opposite sprocket 67 a drive pulley 77. Pulley 77 drives leaf retainer belt 78 in the direction of the arrow adjacent thereto and around the first tension pulley 79 which is mounted on pivot arm 80 and is biased by spring 81 as shown particularly clear in FIGS. 5 and 6.

Retainer belt 78 is then trained about idler pulleys 82, 83 and 84 and back over drive pulley 77.

It should be particularly pointed out that the upwardly and inwardly direction of travel of both conveyor 73 and retainer belt 78 is in the same direction in their adjacent travel areas and, of course, their speed of travel is synchronized since both are driven by the same drive chain 65.

Idler pulley 83 is rotatively mounted at one end of support arm 85 and such arm is pivoted at 86 and terminates in lever portion 87. A biasing spring 88 is secured to the outer end of lever portion 87 and thus normally will maintain pulley 83 and its belt 78 juxtaposed to conveyor 73. When a product to be conveyed, such as primed tobacco 89, is fed between the conveyor and retainer belt 78, the same can move away from the conveyor an adequate amount to prevent crushing of the product and yet will maintain enough pressure to grip and thus convey the same.

As the tobacco being conveyed between belt 78 and conveyor 73 moves over idler pulley 76, tension pulley 79 will allow pressure to be relieved as it moves against biasing spring 81 thus preventing crushing, bruising or other injury to the tobacco being moved toward the central or longitudinal conveyor 60. As the tobacco reaches the point immediately adjacent drive pulley 72, the same will be released from conveyor 73 and retainer 78 and will be deposited on longitudinal conveyor 60. Belt idler pulley 84 can be adjusted downwardly as indicated in FIGS. 5 and 6 to control the direction of the deposit as indicated by the arrows on such Figs.

The parts and operation of the right lateral conveyor 62 are the same as that described for lateral conveyor 61 and the parts accordingly have been given corresponding numbers using the prime symbol. The only difference in the right and left conveyors is the training of drive chain 66 about drive sprocket 64. Since an inwardly direction from opposite sides must necessarily be driven in opposite directions, chain 66 is trained about drive sprocket 64 mounted on main shaft 48 and then reverses itself through the use of a pair of reversal sprockets 90 and 91 so that such chain's direction of travel is in the direction shown by the arrow adjacent thereto. Once the reverse motion in chain drive 66 has been accomplished, its operation and driving of conveyor 73' and retainer belt 78' is the same with an upwardly and inwardly, normally juxtaposed, synchronized direction of travel for leaf deposit on longitudinal conveyor 60.

The main frame 31 of the present invention has been indicated as being a hollow box beam type member. Trailer draw bar 92 is adapted to telescope into frame 31 as shown clearly in FIG. 8. A retainer for releasably securing the draw bar 92 relative to frame 31 is shown in the form of a pin or set screw 93. This, of course, allows the trailer 12 to be towed at varying distances behind the harvester 10. The purpose of this telescoping draw bar will become more apparent from the following description of the operation of the present invention.

A connector tongue 94 is provided on one side of trailer draw bar 92 and is adapted to be secured to the trailer tongue 96 by normal coupling means such as draw pin 97.

Since the trailer draw bar 92 is releasably and removably mountable within frame 31, it can be reversed as shown in dotted lines in FIG. 8 thus allowing the height of the trailer tongue when connected to the trailer draw bar to be varied. This is important in allowing many different makes and types of trailers to be used in conjunction with the harvester 10.

The trailer 12 is adapted to carry one or more (and preferably a plurality of) containers such as bulk type curing boxes 98. Boxes or containers of this type are well known to those skilled in the art and further description of the same is not deemed necessary.

When the trailer 12 is pulled up as close as possible to the harvester 10 with the trailer draw bar 92 fully telescoped, the rearmost bulk container or box 98 will be disposed below the end of longitudinal conveyor 60 and as the tobacco is conveyed upwardly and rearwardly along such conveyor, it will be deposited into such container. When this container is full, release 93 can be manipulated to allow draw bar 92 to slide out of frame 31 a distance such that the front box 98 is below the end of conveyor 60. This box or container can then be filled and once the process is completed, the trailer can be disconnected for transport to the curing barn and another trailer connected in its place.

Should an even greater amount of tobacco wish to be harvested prior to the trailer 95 becoming loaded and having to be replaced, a conveyor extension indicated generally at 99 can be provided. This extension is in the form of a pair of L-shaped arms 100 fixedly attached to conveyor support 101. The outer end of support 101 has a conveyor idler 102 rotatively mounted thereon.

The extension conveyor 104 is driven by drive shaft 103 which in turn is rotated by belt 105 which is driven by pulley 106. This pulley fixedly secured to the end of conveyor drive shaft 54 opposite drive shaft pulley 53.

The end of arms 100 opposite conveyor supports 101 are pivoted at 107 to conveyor side member extensions 57'. As can be seen clearly in FIG. 3, the use of the conveyor extension 99 allows additional bulk containers 98 to be carried on trailer 95 during the harvesting process. The trailer draw bar 92 can be extended outwardly as hereinabove described until all boxes have been filled or the conveyor extension can simply be flipped up about pivot 107 to the position shown in dotted lines of FIG. 3 for loading of the more forward containers.

Figure 9:
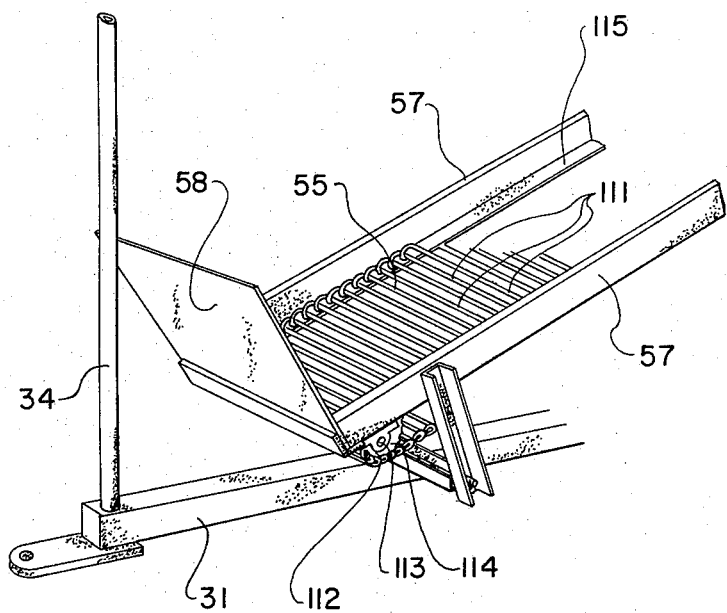
FIG. 9 is a fragmentary perspective view of the front portion showing the details of the longitudinal conveyor.

FIG. 9 discloses details of the longitudinal conveyor 55. A plurality of finger or rod-like members 111 are loopingly interconnected to form a flexible tobacco supporting and conveying surface. A bearing block 112 is mounted on either side and to the lower portion of the front end of elongated side members 57 and are adapted to rotatively carry sprocket shaft 113. Sprocket 114 is fixedly or otherwise mounted on shaft 113, one of such sprockets being provided adjacent each of the conveyor side members 57. These sprockets are adapted to carry conveyor 55 in its open rod form. To prevent undesired sagging of the fingers 111 as the conveyor 55 moves upwardly and rearwardly, an inwardly projecting flange 155 is provided on the lower portion of each of the side members 57. As can clearly be seen in FIG. 9, this last mentioned flange slidably mounts conveyor 55 and supports the same.

In the priming of tobacco particularly the lug or lower leaves, dirt, grit and other foreign matter splashed by rain, or other causes, greatly reduce the value of these leaves in the marketplace. By conveying the leaves from the priming station to the bulk box 12 on an open conveyor, the dirt, grit and other foreign matter can be shaken either by the normal vibrations of the conveyor in operation or through the use of special vibrator means (not shown) to cleanse the tobacco for higher grading and thus a greater sales price at the market.

To use the harvester 10 of the present invention, the same is connected to tractor 11 by pin 15. The trailer 12 is then connected behind harvester 10 by pin 97 and an appropriate number of boxes or containers 98 are placed on such trailer. Once the field to be primed or harvested has been reached, rear seats 43 are adjusted by sliding T-member 41 on member 40 until the desired lateral spacing is accomplished for the primer or cropper (not shown) to be disposed adjacent the row of tobacco to be primed. Tractor 11 then starts down the fifth or empty row and the forward or inboard primer riding on seat 43 will prime or harvest the tobacco on the first row of tobacco 108. As the leaves are removed from the stalk they are placed directly on conveyor 55.

Since the pto 16 of the tractor is engaged and made rotationally operational as soon as the harvesting process begins, through the movement of belt 25, shaft 48 and belt 52, said conveyor 55 will be driven upwardly and rearwardly carrying the tobacco placed thereon with it.

The second or outboard set of primers (not shown) riding on seats 43' will remove leaves from the second or outer row 109 and place such removed leaves between conveyor 73 and retainer 78 of the respective lateral conveyors 61 and 62. These conveyors are driven by shaft 48 and through the effect of drive chains 65 and 66, such conveyors and their associated retainers move in unison upwardly and then inwardly to a point over conveyor belt 55 of longitudinal conveyor 60. The tobacco thus is deposited on the upwardly and rearwardly moving conveyor and then is deposited, along with the tobacco deposited by the primers riding on seats 43, into one of the bulk curing boxes or containers 98.

Once the container under the rearmost portion of conveyor 60 is filled, the releasable trailer draw bar holding means 93 is released to increase the distance between trailer 12 and harvester 10 so that the next container 98 to be filled can be disposed beneath such conveyor. This letting out of the telescoping trailer draw bar 92 is continued as each box is filled until all of the boxes on trailer 12 are full. The trailer is then disconnected from the harvester and can be carried to the curing barn and another trailer with empty boxes placed in towing position behind such harvester.

If, of course, an extra long trailer 12 is used so that replacement of the same is not required as frequently, the conveyor extension 99 can be used and placed in the position shown in solid lines in FIG. 3 thus allowing the tobacco, when it is deposited off the rear portion of conveyor 60, to continue to move rearwardly on conveyor 104 and to be deposited at the rearmost end thereof adjacent idler 102. Through coordination of the telescoping tongue 92 and extension conveyor 99, all of the multiplicity of boxes 98 on trailer 12 can be filled.

A canvas or other type of cover 110 can be tied or otherwise secured to the roof frame structure 39 in the normal manner of such covers or awnings.

From the above, it can be seen that the present invention has the advantage of providing a relatively simple and yet highly efficient tobacco harvester which requires only one pair of outboard seats to prime four rows of tobacco. This requires less strength in the harvester's super structure, prevents the device from being overly tipsy, and allows the inboard primers to place their tobacco directly onto a single conveyor which moves such tobacco directly into a curing container carried on a separate vehicle. This arrangement additionally has the advantage of requiring only two lateral conveyors although four primers are being used to crop the tobacco. An even further advantage of the present invention is that the mechanical drive and conveyor means are simple to maintain and can easily be repaired on the rare occasions that the same may be required. Finally any number of different types of trailers can be used in conjunction with the harvester of the present invention thus adding greater versatility to the same.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A harvesting device of the tobacco type comprising: a frame means; a pair of front seat means mounted one on each side of said frame means and adjacent thereto; a foldable foot rest means mounted adjacent each of said front seat means whereby when said harvesting device is towed behind a separate vehicle, said foot rest can be folded out of the way during sharpe articulated turns; a pair of rear seat means mounted one on each side of said frame means outwardly of said front seat means a distance approximately equaling the width of a crop row; a longitudinally disposed, rearwardly driven conveyor means in the form of an open interconnected plurality of rod-like fingers mounted on said frame and extended from adjacent and between said front seat means rearwardly and upwardly to an elevated, outwardly projecting position behind said frame means; conveyor means extended upwardly and inwardly from adjacent each of said rear seat means to above said longitudinal conveyor means whereby as the crop adjacent each of said front seat means is harvested, it can be deposited directly on said longitudinal conveyor and as the crop adjacent each of said rear seat means is harvested, it can be conveyed therefrom to above and deposited on said longitudinal conveyor; and a crop receiving means articulatingly connected to and disposed rearwardly of said frame means below the rear portion of said longitudinal conveyor means whereby an improved harvester means is provided.

2. The harvesting device of claim 1 wherein said frame is tractor towed.

3. The harvesting device of claim 1 wherein each of said rear seat conveyor means is a generally flat conveyor with an adjacent, co-moving retaining belt.

4. The harvesting device of claim 3 wherein the retainer belt is resiliently tensioned whereby the crop being conveyed will not be crushed or otherwise damaged.

5. The harvesting device of claim 1 wherein both said longitudinal and said inwardly extending conveyors are of the constant speed, power driven type.

6. The harvesting device of claim 5 wherein the means for driving said conveyors is the power takeoff of a towing vehicle.

7. The harvesting device of claim 1 wherein the articulated, crop receiving means is a harvester towed trailer.

8. The harvesting device of claim 7 wherein the articulated trailer includes at least one removable crop receiving container.

9. The harvesting device of claim 8 wherein said removable container is of the bulk curing type.

10. The harvesting device of claim 1 wherein the articulated crop receiving means is longitudinally adjustable relative to said harvester whereby a plurality of separate crop receiving means can be carried thereon and successively filled.

11. The harvesting device of claim 10 wherein the means for longitudinally adjusting said articulated crop receiving means is a telescoping draw bar means.

12. The harvesting device of claim 10 wherein an operable, rearwardly extending conveyor extension for said longitudinal conveyor is provided whereby additional crop receiving means can be filled.

13. The harvesting device of claim 1 wherein an operable, rearwardly extending longitudinal conveyor extension means is provided whereby additional separate crop receiving means can be filled.

* * * * *